United States Patent
Price et al.

(10) Patent No.: US 11,673,975 B2
(45) Date of Patent: Jun. 13, 2023

(54) SYSTEM AND METHOD FOR IMPROVING DUMP TANK PURGE TIME

(71) Applicant: Chevron Phillips Chemical Company LP, The Woodlands, TX (US)

(72) Inventors: Bradley T. Price, Kingwood, TX (US); Jamie N. Sutherland, Porter, TX (US); Joseph A Curren, Houston, TX (US); James E. Hein, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 60 days.

(21) Appl. No.: 17/409,958

(22) Filed: Aug. 24, 2021

(65) Prior Publication Data

US 2023/0061539 A1    Mar. 2, 2023

(51) Int. Cl.
*C08F 2/00*   (2006.01)
*C08F 10/02*  (2006.01)
(Continued)

(52) U.S. Cl.
CPC ............ *C08F 2/008* (2013.01); *B01J 4/008* (2013.01); *B01J 8/006* (2013.01); *B01J 8/0015* (2013.01); *B01J 19/2435* (2013.01); *C08F 2/01* (2013.01); *C08F 2/14* (2013.01); *C08F 6/10* (2013.01); *C08F 10/02* (2013.01); *B01J 2219/0004* (2013.01); *B01J 2219/00042* (2013.01); *B01J 2219/00162* (2013.01)

(58) Field of Classification Search
USPC ..................................................... 528/502 A
See application file for complete search history.

(56) References Cited

U.S. PATENT DOCUMENTS 3,356,662 A * 12/1967 Anderson ............... C08F 6/003
                                                    528/502 A
5,376,742 A    12/1994 Krause
(Continued)

FOREIGN PATENT DOCUMENTS

| CN | 1302225 C | 2/2007 |
| WO | 2010027912 A1 | 3/2010 |
| WO | 2020227251 A1 | 11/2020 |

OTHER PUBLICATIONS

International Search Report and Written Opinion issued in corresponding application No. PCT/US2022.074948, dated Dec. 9, 2022, 15 pp.

*Primary Examiner* — Fred M Teskin
(74) *Attorney, Agent, or Firm* — Conley Rose, P.C.

(57) ABSTRACT

A system including a dump tank to receive a reactor product comprising a polymer and hydrocarbons, including liquid hydrocarbons, the dump tank including a vessel with a reactor product inlet, a motive gas inlet, a purge gas inlet, gas outlet(s), and a fluid outlet, the motive gas inlet for introducing a motive gas into the vessel, the purge gas inlet for introducing a purge gas into the vessel, the one or more gas outlets located at a top of the vessel and the fluid outlet located at a bottom of the vessel and fluidly connected with a dump tank fluid outlet line having a dump tank outlet valve to control flow of fluid out of the dump tank via the fluid outlet; and a strainer fluidly connected with the dump tank fluid outlet line to allow passage of liquid hydrocarbons therethrough into a hydrocarbon outlet line.

20 Claims, 3 Drawing Sheets

(51) Int. Cl.
*C08F 2/01* (2006.01)
*B01J 19/24* (2006.01)
*B01J 8/00* (2006.01)
*B01J 4/00* (2006.01)
*C08F 6/10* (2006.01)
*C08F 2/14* (2006.01)

(56) References Cited

U.S. PATENT DOCUMENTS

| | | |
|---|---|---|
| 6,472,483 B1 | 10/2002 | Goode |
| 6,559,247 B2 | 5/2003 | Kufeld |
| 7,098,301 B1 * | 8/2006 | Smith ............... B01J 8/006 528/502 A |
| 7,999,044 B2 | 8/2011 | Hottovy |
| 8,129,486 B2 | 3/2012 | Force |
| 8,258,245 B2 | 9/2012 | Fouarge |
| 2002/0182121 A1 | 12/2002 | Kendrick |
| 2020/0354483 A1 | 11/2020 | Curren |

* cited by examiner

SYSTEM AND METHOD FOR IMPROVING DUMP TANK PURGE TIME

CROSS-REFERENCE TO RELATED APPLICATIONS

None.

STATEMENT REGARDING FEDERALLY SPONSORED RESEARCH OR DEVELOPMENT

Not applicable.

TECHNICAL FIELD

The disclosed apparatus, systems, and methods relate to transferring (e.g., "dumping") the contents or inventory of one or more polymerization reactors to a relief vessel (e.g., a "dump" tank). More specifically, the disclosed apparatus, systems, and methods relate to improved dump tanks and methods of removing non-product components from a polymerization reactor inventory comprising polymer fluff transferred to a dump tank during a polymerization reactor dump. Still more specifically, the disclosed apparatus, systems, and methods relate to improved methods of removing non-product components of a polymerization reactor inventory transferred to a dump tank during a polymerization reactor dump via draining of non-product liquids through a strainer and optional subsequent filter.

BACKGROUND

During certain atypical operating situations within a polymerization unit, such as, without limitation, loss of utilities (e.g., power), loss of steam, loss of a circulation pump/circulation pump seal, loss of reactor outlets, or any other significant event where continuing to circulate or have polymer in a polymerization reactor is undesirable, there is a need to quickly divert, drain or empty the polymerization reactor (e.g., to "dump" the contents or "inventory" of the polymerization reactor). Polymerization units are typically equipped with dump tanks for this purpose.

In large units, the length of time necessary to remove residual hydrocarbons from the polymer fluff transferred to the dump tank (also referred to as a polymer bed) can be very long, sometimes longer than ten or more days. Removing the residual hydrocarbons from the fluff can sometimes become the critical-path during shutdown activities, and there is a desire to speed up the removal process. The hydrocarbon removal process can take a long time because residual liquids are conventionally evaporated, and residual hydrocarbons sorbed into the polymer bed must be cleared. Both of these processes are strongly dependent upon temperature and heat input, and conventional plants have limited ability to introduce a significant amount of heat into the stagnant, non-flowing bed of polymer and liquids in the dump tank. Conventionally, the dump tank is equipped with a steam jacket on a bottom cone thereof. However, the polymer is a fairly good insulator and there is also considerable risk of melting stagnant, trapped lower density polymers against the cone, making it challenging to empty the polymer out of the dump tank after clearing the hydrocarbons therefrom by heating with such a steam jacket.

Accordingly, there exists a need for systems and methods for enhancing a polymerization reactor dumping process.

SUMMARY

Herein disclosed is a system comprising: a dump tank configured to receive a reactor product comprising a polymer and hydrocarbons, including liquid hydrocarbons, wherein the dump tank comprises a vessel having a reactor product inlet, a motive gas inlet, a purge gas inlet, one or more gas outlets, and a fluid outlet, wherein the motive gas inlet is configured to introduce a motive gas into an upper portion of the vessel, wherein the purge gas inlet is configured to introduce a purge gas into a lower portion of the vessel, wherein the one or more gas outlets are located at a top, and wherein the fluid outlet is located at a bottom of the vessel and fluidly connected with a dump tank fluid outlet line having a dump tank outlet valve to control flow of fluid out of the dump tank via the fluid outlet; and a strainer, wherein the strainer is fluidly connected with the dump tank fluid outlet line and allows passage of liquid hydrocarbons therethrough into a hydrocarbon outlet line and prevents passage therethrough of particles having a retained particle size of greater than about 50, 100, or 150 micrometers (μm).

Also disclosed herein is a method comprising: introducing a polymer product from a polymerization reactor into a dump tank of the disclosed system; and draining liquid hydrocarbons from the dump tank by: opening the dump tank outlet valve on the dump tank fluid outlet line and introducing motive gas via the motive gas inlet, whereby fluid comprising liquid hydrocarbons and motive gas flows out the fluid outlet to the strainer, whereby the liquid hydrocarbons pass through the strainer to the hydrocarbon outlet line and particles having the particle size greater than the retained particle size are prevented passage through the strainer to the hydrocarbon outlet line; monitoring the hydrocarbon outlet line to determine when a majority of the liquid hydrocarbons have been removed from the vessel; and ceasing the introducing of the motive gas into the dump tank and closing the dump tank outlet valve.

Further disclosed herein is a method comprising: introducing a polymer product from a polymerization reactor into a dump tank, wherein the polymer product comprises a polymer and hydrocarbons, including liquid hydrocarbons, and wherein the dump tank comprises: a vessel having a reactor product inlet, a motive gas inlet, a purge gas inlet, one or more gas outlets, and a fluid outlet, wherein the motive gas inlet is configured to introduce a motive gas into an upper portion of the vessel, wherein the purge gas inlet is configured to introduce a purge gas into a lower portion of the vessel, wherein the one or more gas outlets are located at a top, and wherein the fluid outlet is located at a bottom of the vessel and fluidly connected with a dump tank fluid outlet line having a dump tank outlet valve to control flow of fluid out of the dump tank via the fluid outlet, wherein the dump tank outlet valve is in a closed position during the introducing of the polymer product into the dump tank from the reactor; and draining liquid hydrocarbons from the dump tank by: opening the dump tank outlet valve on the fluid outlet line and introducing motive gas at a motive gas pressure via the motive gas inlet, whereby fluid comprising liquid hydrocarbons and motive gas flows out the fluid outlet to a strainer, whereby the liquid hydrocarbons pass, as a strained liquid, through the strainer to a hydrocarbon outlet line and particles having the particle size greater than a retained particle size are prevented passage through the strainer to the hydrocarbon outlet line, wherein the strainer is fluidly connected with the fluid outlet line and has a strainer mesh size that allows passage of liquid hydrocarbons therethrough into the hydrocarbon outlet line and prevents passage therethrough of particles having a retained particle size of greater than about 50, 100, or 150 micrometers (μm); and maintaining a pressure of the dump tank at a draining pressure of greater than a vapor pressure of the hydrocarbons in the polymer product until a majority of the liquid hydrocarbons have been removed from the vessel, such that a majority of the hydrocarbons remain liquid during the draining; and ceasing the introducing of the motive gas into the dump tank and closing the dump tank outlet valve.

BRIEF DESCRIPTION OF THE DRAWINGS

The detailed description will reference the drawings briefly described below, wherein like reference numerals represent like parts, unless otherwise indicated.

DETAILED DESCRIPTION

Significant economic opportunities can be lost during and after a reactor dump, because the dump system must be cleared of polymer powder before the reactor can be restarted. Most of the delay is typically a result of the time it takes to purge the dump tank powder of hydrocarbon. The system and method of this disclosure provide for a reduction in a time needed for purging of the dump tank vessel, in embodiments, reducing the needed time to less than a few days (e.g., less than 36, 24, 12, or 10 hours). The system and method disclosed herein reduce the dump tank purge time by reducing an amount of hydrocarbon requiring purging and enabling for maintaining of a higher temperature during the purging.

Figure 1:
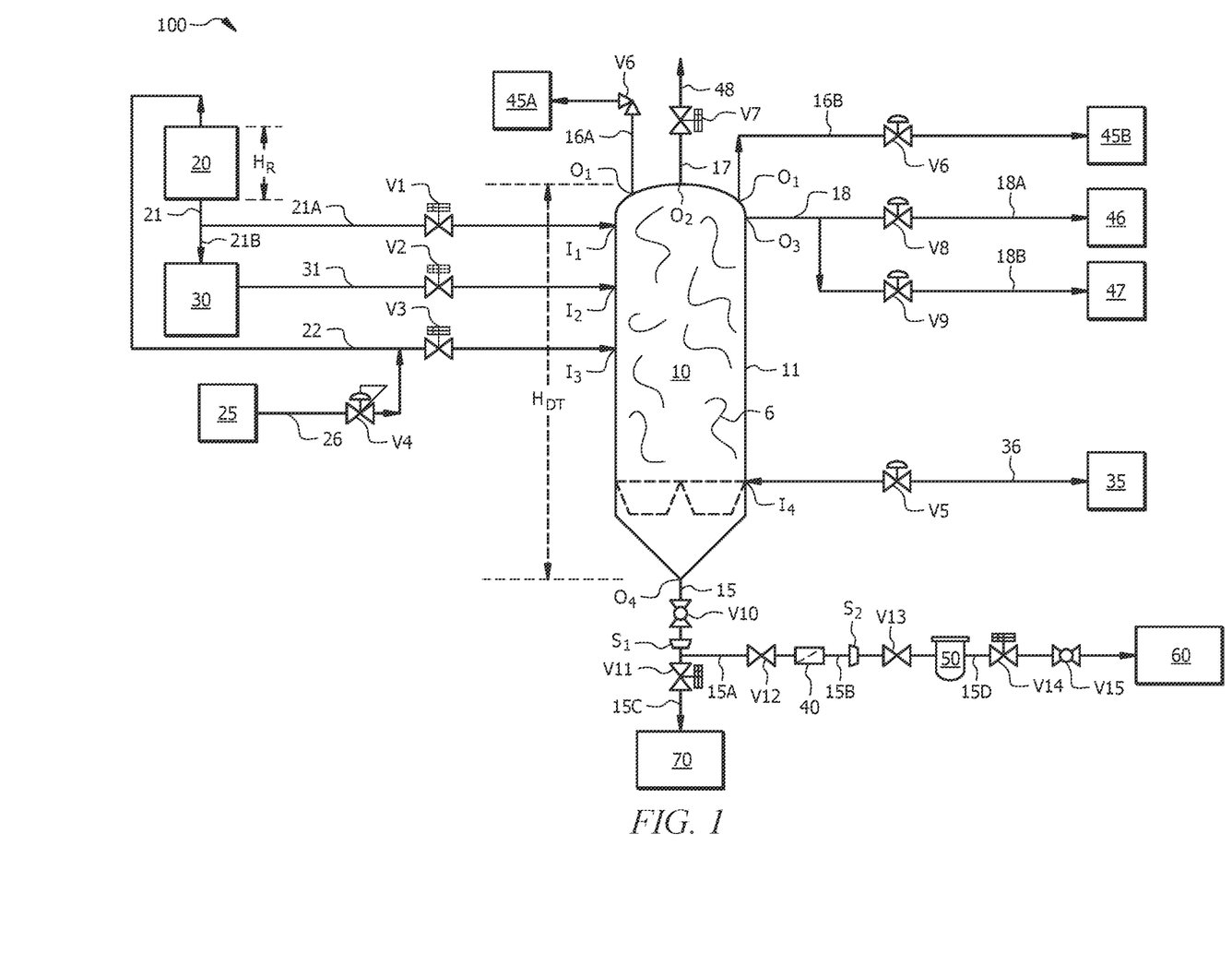
FIG. 1 is a schematic of a dump tank system, according to embodiments of this disclosure.

With reference to FIG. 1, which is a simplified a schematic of a dump tank system 100, according to embodiments of this disclosure, a system 100 of this disclosure comprises a dump tank 10 and a strainer 40. The dump tank 10 is configured to receive a reactor product comprising a polymer and hydrocarbons, including liquid hydrocarbons, and comprises a vessel 11 having one or more reactor product inlets, e.g., a reactor product inlet I1 and flashline dump inlet I2 depicted in FIG. 1, a motive gas inlet I3, a purge gas inlet I4, one or more gas outlets, e.g., outlets O1-O3, and a fluid outlet O4. The motive gas inlet I3 is configured to introduce a motive gas into an upper portion of the vessel 11 (e.g., is located in an upper 50, 45, 40, 35, 30, 25, 20, 15, or 10% along a height $H_{DT}$ of the vessel 11). The purge gas inlet I4 is configured to introduce a purge gas into a lower portion of the vessel 11 (e.g., is located in a lower 50, 45, 40, 35, 30, 25, 20, 15, or 10% along the height $H_{DT}$ of the vessel 11).

The one or more gas outlets O, e.g., O1-O3, are located at a top of the vessel 11 (e.g., within a top 40, 35, 30, 25, 20, 15, or 10% of the height $H_{DT}$ of the vessel 11). The one or more gas outlets can include one or more flare outlets O1 fluidly connected via a flare outlet line 16A/16B having valves V6 to a flare 45A/45B, an outlet to atmosphere O2 having a line 17 and valve V7 for introducing outlet gas to the atmosphere, an isobutane and nitrogen recovery unit (INRU) and/or flash gas system outlet O3 fluidly connected via an outlet line 18, and a line 18A having a valve V8 to an INRU 46 and/or fluidly connected via an outlet line 18, and a line 18B having a valve V9 to a flash gas system 47, or a combination thereof. Although depicted as a single outlet O3, in embodiments, vessel 11 can comprise separate outlets O3 directed to the INRU 46 and the flash gas system 47.

The fluid outlet O4 is located at a bottom of the vessel 11 (e.g., within a bottom 40, 35, 30, 25, 20, 15, or 10% of the height $H_{DT}$ of the vessel 11) and fluidly connected with a dump tank fluid outlet line 15 having a dump tank outlet valve V11 to control flow of fluid out of the dump tank 10 via the fluid outlet O4. The strainer 40 is fluidly connected with the dump tank fluid outlet line 15 and allows passage of liquid hydrocarbons therethrough into a hydrocarbon outlet line 15B and prevents passage therethrough of particles having a particle size of greater than a retained particle size (e.g., greater than or equal to about 50, 100, or 150 micrometers (μm)). The strainer 40 can be any strainer suitable for this application, e.g., operable to retain the majority of the polymer powder volume, minimize the pressure drop, and withstand the differential pressure created by the hydrocarbon liquid flowing through the polymer powder such that damage to the strainer 40 during the draining of the dump tank 10 is prevented. In embodiments, strainer 40 retains solid particles having a retained particle size greater than 50 to 150 microns. In embodiments, strainer 40 can be positioned as close as reasonably possible to fluid outlet line 15 (e.g., strainer inlet line 15A can be as short as possible), to minimize an amount of retained polymer through which liquid hydrocarbons must pass after exiting vessel 11 to reach strainer 40. Strainer 40 can be any suitable strainer known in the art. In embodiments, strainer inlet line 15A is sloped upward from dump tank fluid outlet line 15, to minimize or prevent polymer accumulation during the transfer of polymer from dump tank 10 (e.g., to a dumpster 70, described hereinbelow).

In embodiments, for example, strainer 40 can comprise a Johnson screen V-wire strainer, a wedge wire strainer, a perforated metal strainer, a mesh slotted basket, an automatic self-cleaning strainer, a perforated plate, a y strainer, a wye strainer, a t strainer, a tee strainer, a temporary strainer, or a combination thereof. A swedge S1 on fluid outlet line 15 and a swedge S2 on hydrocarbon outlet line 15B can be operable to adjust piping. For example, and without limitation, S1 can be from about 18 inches (45.7 cm) to about 10 inches (25.4 cm), and S2 can be from about 10 inches (25.4 cm) to about 4 inches (10.2 cm).

For isolation purposes a valve V12 (e.g., a manual block valve) can be positioned on strainer inlet line 15A (e.g., upstream of the strainer 40). Valve V12 can allow for double block and bleed between the dump tank 10 and the strainer 40, for example, in case strainer 40 needs to be removed for cleaning, or etc. Valve V12 can have a valve position indication; when the dump tank 10 is finally cleared and just prior to opening a vent valve (e.g., valve V7) to the atmosphere and the dump valve (e.g., valve V11) to dumpster 70, the path to the strainer 40 can be confirmed closed. If valve V12 were inadvertently left open, it could create a potential back flow of hydrocarbon to the atmosphere; the position indication on valve V12 can provide a layer of protection, before opening either valve (e.g., valve V7 and/or valve V11).

The system 100 can further comprise a filter 50 downstream of the strainer 40 and fluidly connected therewith via the hydrocarbon outlet line 15B. Filter 50 prevents passage therethrough of particles with the liquid hydrocarbons. The downstream filter 50, when present, can be any suitable filter operable to retain any fine polymer particles that pass through the strainer 40. For example, filter 50 can prevent passage therethrough of solid particles having a particle size of greater than about 150, 100, 50, 35, 25, 15, 10, 9, 8, 7, 6, 5, 4, 3, 2, or 1 μm (e.g., greater than about 1 to 15, 15 to 25, 25 to 35, 35 to 50, 50 to 100, or 100 to 150 μm). Other mesh sizes for strainer 40 and filter 50 are envisioned and are thus within the scope of this disclosure.

Strainer 40 and/or filter 50 can be designed and installed at or below the dump tank 10 (e.g., in an arrangement that allows liquid hydrocarbon to flow out of the vessel 11).

System 100 can further comprise a source of the motive gas, wherein the source of the motive gas 25 (also referred to herein as a "motive gas source" or "vapor motive force" 25) is fluidly connected with the motive gas inlet I3. The motive gas source 25 can comprise one or more lines and/or a tank comprising the motive gas. The motive gas can comprise ethylene, ethane, nitrogen, fuel gas, methane, or a combination thereof. In embodiments, the vapor motive force can be or can comprise ethylene, nitrogen, or another high-pressure gas source with sufficient pressure and flow rate to allow for a reasonable draining time of dump tank 10. The vapor pressure of the liquid (e.g., hydrocarbon liquid) in the dump tank 10 may not be sufficient to push all the liquid out of the vessel 11 without additional "motive" gas, depending on the situation. Accordingly, a motive gas can be utilized to push the liquid through the strainer 40 and, when present, the filter 50. The motive gas is selected to be compatible with the hydrocarbon liquid to prevent contamination of the separated hydrocarbon liquid in hydrocarbon outlet line 15B, which can be sent to the recycle isobutane tank, the dehexanizer column, or another downstream unit 60, as described further hereinbelow.

In embodiments, the system 100 of this disclosure can further comprise a purge gas source 35 fluidly connected with the purge gas inlet I4. The purge gas source 35 can comprise at least one line and/or a tank comprising the purge gas. The purge gas can comprise nitrogen (e.g., at least 95, 96, 97, 98, 98.5, or 99 wt % nitrogen), fuel gas, cracker tail gas, methane, or a combination thereof. As utilized herein, "fuel gas" comprises natural gas, e.g., supplied via pipeline to the plant. For example, the fuel gas can comprise or consist of 90 wt % methane or more, with the balance comprising primarily ethane, carbon dioxide, nitrogen, and/or other small quantities of lighter hydrocarbon gases that can accompany natural gas pipelines. In embodiments, the "clean light gas" comprises less than 10 wt % hydrocarbon in an inert gas. In embodiments, utilizing fuel gas, rather than nitrogen, as the purge gas can further reduce the purge time by increasing the purge gas heat capacity.

System 100 can further comprise the reactor 20 from which the reactor product in reactor product outlet line(s) 21 is produced. Reactor 20 is upstream from the dump tank 10, and is fluidly connected via reactor product outlet line(s) 21 with the reactor product inlet(s) of the dump tank 10. For example, in FIG. 1, a portion of the reactor product in reactor product outlet line 21 is introduced via reactor product outlet line 21A (also referred to herein as a "reactor product dump line" 21A) into dump tank 10 via reactor product inlet I1 of dump tank 10, and another portion 21B of the reactor product in reactor product outlet line 21 is introduced into one or more flashline heater(s) 30. Reactor product removed from the flashline heater(s) 30 via one or more flashline heater dump lines 31 can be introduced into dump tank 10 via one or more flashline dump inlets 12 of dump tank 10. A valve V1 can be utilized to control flow in reactor product dump line(s) 21A, and a valve V2 can be utilized to control flow in flashline heater dump line(s) 31. A reactor top vent line 22, having a valve V3, can fluidly connect a top vent of the polymerization reactor 20 with an inlet (e.g., motive gas inlet I3) of dump tank 10.

Dump tank system 100 can comprise one or more polymerization reactors 20, such as liquid-phase or gas-phase reactors. The polymerization system can also comprise a combination of liquid and gas-phase reactors. If the polymerization system comprises multiple polymerization reactors, the polymerization reactors may be arranged in series, in parallel, or in any other suitable combination or configuration. In the polymerization reactors, one or more olefin monomers are polymerized to form a product comprising polymer particulates, typically and herein called polymer fluff. The polymer fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected, as known to those of skill in the art and with the help of this disclosure, to achieve the desired polymer fluff properties. In addition to the one or more olefin monomers, a catalyst that facilitates polymerization of the monomer is typically added to the polymerization reactor 20. The catalyst may be a particle suspended in the fluid medium within the polymerization reactor 20. In general, Phillips catalyst, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. An olefin-free diluent or mineral oil may be used, for example, in the preparation and/or delivery of the catalyst to the polymerization reactor 20. Further, diluent may be fed into the polymerization reactor 20, typically a liquid-phase reactor. The diluent may be an inert hydrocarbon that is liquid at reaction conditions, such as, without limitation, isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the polymerization reactor 20, for example forming a slurry. Some polymerization processes may not employ a separate diluent, such as in the case of selected polypropylene production where the propylene monomer itself may act as the diluent.

A motive device may be present within the polymerization reactor 20 of the polymerization system. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

As discussed above, dump tank system 100 can comprise one or more polymerization reactors 20, which may in turn be of the same or different types. Furthermore, in multiple reactor systems, the reactors may be arranged serially or in parallel. Whatever the reactor types, a solid polyolefin particulate product, generically referred to as "polymer fluff", "polymer powder", or simply "polymer" herein, is produced. In embodiments, polymerization reactor 20 comprises a reactor within which polymerization occurs within a liquid phase. Examples of such liquid phase reactors include autoclaves, boiling liquid-pool reactors, loop slurry reactors, and so forth. In embodiments, the polymerization reactor 20 comprises a loop slurry reactor. In embodiments, the solid product polyolefin comprises polyethylene (and its copolymers). It is to be understood that the present techniques are similarly applicable to other types of liquid phase reactors and polymerizations.

A loop slurry reactor is generally composed of segments of pipe connected by smooth bends or elbows. In embodiments, the polymerization reactor 20 can be used to carry out polyethylene polymerization under slurry conditions in which insoluble particles of polyolefin, such as polyethylene or polypropylene, are formed in a fluid medium and are suspended as slurry until removed. A motive device, such as a pump, circulates the fluid slurry in the reactor. An example of a pump is an in-line axial flow pump with the pump impeller disposed within the interior of the reactor to create a turbulent mixing zone within the fluid medium. The impeller may also assist in propelling the fluid medium through the closed loop of the reactor at sufficient speed to keep solid particulates, such as the catalyst or product polyolefin, suspended within the fluid medium. The impeller may be driven by a motor or other motive force. In an embodiment, polymerization reactor 20 is a loop slurry reactor that is coupled to dump tank 10 (e.g., reactor dump line(s) 21A is(are) coupled to dump tank 10) such that dump tank 10 receives the slurried contents (e.g., inventory) of the loop slurry reactor upon a need to dump same.

The fluid medium within the polymerization reactor 20 may include olefin monomers and comonomers, diluent, co-catalysts (e.g., triethylboron, methyl aluminoxane, alkyls such as triethylaluminum, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the polymerization reactor interior via inlets or conduits at specified locations, such as depicted at polymerization reactor feed line 25.

Likewise, a catalyst, such as those previously discussed, may be added to the polymerization reactor 20 via a conduit at a suitable location, which may include a diluent carrier. An example of a catalyst for polymerizing the ethylene monomer and comonomers which are present includes a chromium oxide containing a hexavalent chromium (or Cr') on a silica support. It should be explained that in certain embodiments the chromium in the catalyst feedstock is received at the polyolefin facility as $Cr^{+3}$. This catalyst may be subjected to a carbon monoxide (CO) activation process resulting in a valence change to $Cr^{+6}$ in the activated catalyst. Subsequently, during polymerization in the reactor, the $Cr^{+6}$ valence in the activated catalyst changes to $Cr^{+2}$ due to the presence of monomer (e.g., ethylene) in the polymerization contents in the polymerization reactor 20. Advantageously, the $Cr^{+2}$ sites in the catalyst are active for polymerization. However, it should be emphasized, as previously discussed, that a variety of catalyst systems other than chromium systems, and methods of activating same, may be employed. For example, and without limitation, in embodiments, chrome catalyst can be activated by heating in the presence of air.

In total, the added components in the polymerization reactor 20 generally include a fluid medium within the reactor 20 within which the catalyst is a suspended particle. The reaction conditions, such as temperature, pressure, and reactant concentrations, are regulated to facilitate the desired properties and production rate of the polyolefin in the polymerization reactor 20, to control stability of the polymerization reactor 20, and the like. Temperature is typically maintained below that level at which the polymer product would go into solution. Due to the exothermic nature of the polymerization reaction, a cooling fluid may be circulated through jackets around portions of the polymerization reactor 20 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds within the polymerization reactor 20, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the polymerization reactor 20 via a settling leg or other means, such as, without limitation, a continuous take-off. In downstream processing, such as described in U.S. Patent App. No. 2020/0354483, the polyolefin discharged from the polymerization reactor 20 can be extracted from the slurry and purified.

In embodiments, the reactor 20 comprises a polymerization reactor for the production of polyethylene (e.g., polyethylene homopolymer or polyethylene copolymer such as an ethylene and 1-hexene copolymer). In embodiments, the polymerization reactor comprises a loop slurry reactor. For example, reactor 20 can, in embodiments, comprise a dual loop slurry reactor.

According to this disclosure, the dump tank 10 is fluidly connected with the polymerization reactor 20 such that the inventory of the polymerization reactor 20 can be transferred into the dump tank 10 during a polymerization reactor dump. In embodiments, one or more dedicated polymerization reactor dump lines 21A are coupled to dump tank vessel 11 and utilized to transfer the inventory of the polymerization reactor (depicted as polymer product 6 in FIG. 1) into dump tank 10. Alternatively, polymerization reactor effluent line 21 is coupled to dump tank vessel 11 and utilized to introduce the polymerization reactor inventory into dump tank 10 during a reactor dump. For example, as noted above, dump tank vessel 11 of dump tank 10 as depicted in FIG. 1 can be fluidly connected with reactor 20 via one or more dedicated reactor dump lines 21A and/or via reactor effluent line 21. In embodiments, dump tank 10 is fluidly connected with reactor effluent line 21 downstream of at least one of one or more flashline heaters 30, and the contents of the polymerization reactor 20 are introduced (e.g., dumped) into dump tank 10 one or more flashline heater dump lines 31.

System 100 can further comprise a downstream unit 60 fluidly connected with the hydrocarbon outlet line 15B downstream from the strainer 40 and/or the filter 50, when present. The downstream unit 60 can comprise any downstream unit into which the liquid hydrocarbons drained from the dump tank 10 are to be introduced. For example, by way of non-limiting example, the downstream unit 60 can, in embodiments, comprise a recycle tank (e.g., a recycle surge tank), and/or a heavies or dehexanizer column configured to separate C6 and heavier from the isobutane sent to fractionation. The recycle surge tank can provide surge for recycle isobutane pumps. The heavies/dehexanizer column can be configured to separate hydrocarbons comprising six carbons (C6) and heavier hydrocarbons from isobutane sent to fractionation.

System 100 can further comprise a motive gas valve V4 configured to provide the motive gas to the motive gas inlet I3 of the dump tank 10 at a motive gas pressure, wherein the motive gas pressure is greater than a pressure of the downstream unit 60 and greater than a vapor pressure of the hydrocarbons in the dump tank 10, and provides a differential pressure across the strainer 40 that is less than a maximum differential pressure rating of the strainer 40. In embodiments, the differential pressure across the strainer 40 during the draining of the dump tank 10 is less than about 50, 40, 30, 20, or 10 psig.

For ease of cleaning and or replacement, strainer 40 can, in embodiments, be a drop-in component designed to facilitate removal of the strainer 40 from the system for cleaning or replacing.

Dump tank system 100 can further comprise a dumpster or other container 70 fluidly connected with fluid outlet O4 of dump tank 10 via dump tank fluid outlet line 15 having valve V10 and polymer dump line 15C having valve V11.

Figure 2:
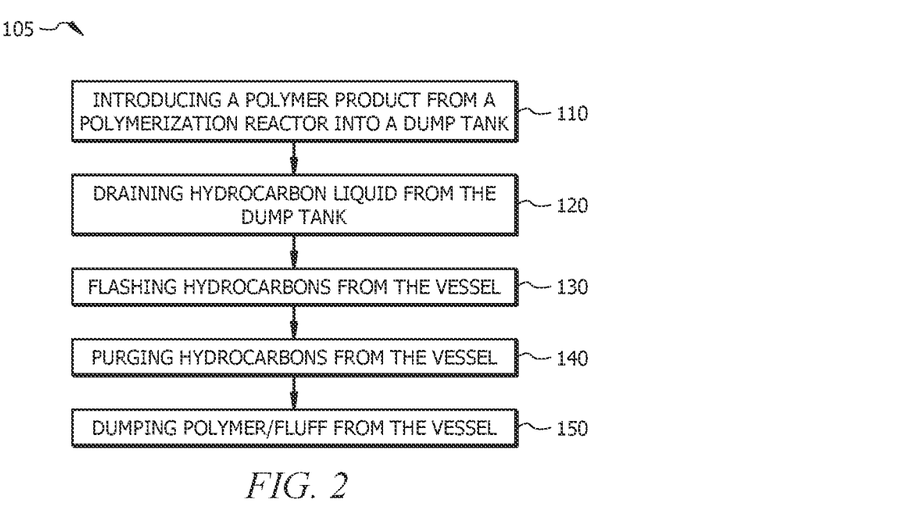
FIG. 2 is a schematic flow diagram of a method, according to embodiments of this disclosure.

A method of operating the dump tank will now be provided with reference to FIG. 2, which is a schematic flow diagram of a method 105, according to embodiments of this disclosure. Method 105 comprises introducing, at 110, a polymer product from polymerization reactor 20 into a dump tank 10 as described hereinabove; and draining, at 120, liquid hydrocarbons from the dump tank 10. The polymer product can be introduced directly from the polymerization reactor 20 and/or a portion of the polymerization product can be introduced subsequent passage through one or more pieces of equipment, such as one or more flashline heaters 30. For example, as depicted in FIG. 1, polymerization product can be introduced into dump tank 10 via one or more reactor product dump lines 21A and/or one or more flashline heater dump lines 31. During the transfer, the pressure of the polymerization reactor 20 and the dump tank 10 can equalize.

Figure 3:
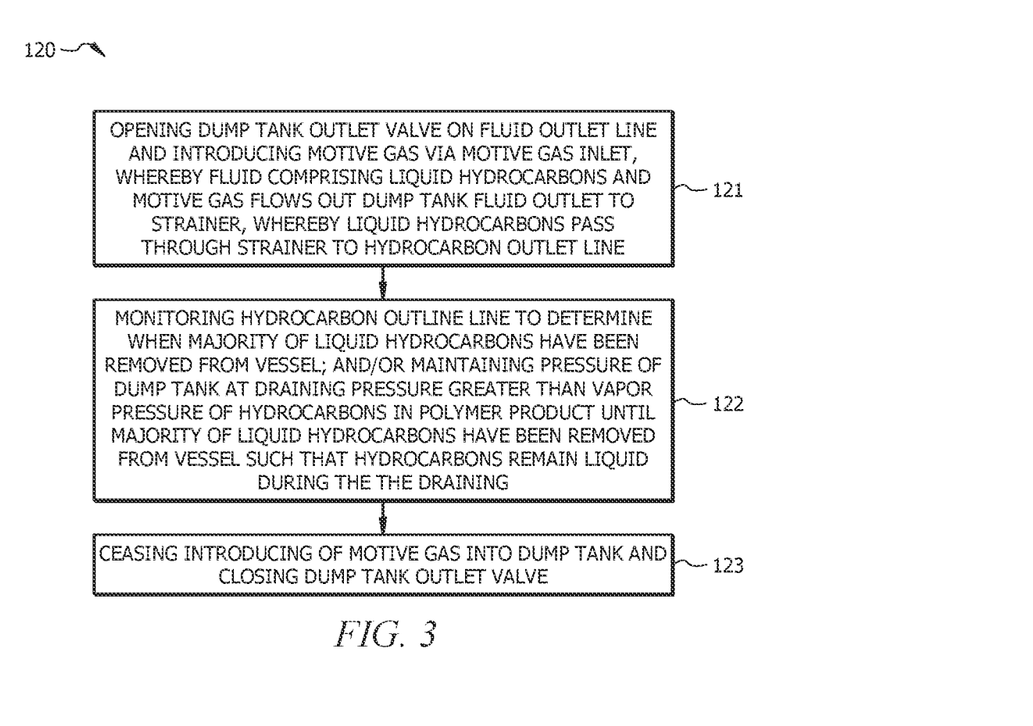
FIG. 3 is a schematic flow diagram of draining hydrocarbon liquid from a dump tank, according to embodiments of this disclosure.

As depicted in FIG. 3, which is a schematic flow diagram of draining hydrocarbon liquid from a dump tank 120, according to embodiments of this disclosure. Draining hydrocarbon liquid from dump tank 10 at 120 can include, at 121, opening the dump tank outlet valve V10 on the dump tank fluid outlet line 15, while valve V11 is closed to prevent flow of fluid to a dumpster or other polymer product container 70, and introducing motive gas into dump tank 10 from motive gas source 25 via the motive gas inlet I3. Introducing of the motive gas at 121 provides a motive force for draining the hydrocarbon liquid from dump tank 10. Fluid comprising liquid hydrocarbons and motive gas flows out the fluid outlet O4 to the strainer 40; the liquid hydrocarbons pass through the strainer 40 to the hydrocarbon outlet line 15B and particles having the particle size greater than the retained particle size are prevented passage through the strainer 40 to the hydrocarbon outlet line 15B. During the draining of the liquid hydrocarbons, the content of the hydrocarbon outlet line 15B can be monitored, at 122 to determine when a majority of the liquid hydrocarbons have been removed from the vessel 11. Method 105 comprises at 123, after a majority of the liquid hydrocarbons have been removed from the vessel 11, ceasing the introducing of the motive gas into the dump tank 10 and closing the dump tank outlet valve O4. Alternatively or additionally, a certain time calculated or known to be sufficient to drain the liquid hydrocarbons can be allowed to pass prior to ceasing the introducing of the motive gas into the dump tank 10 and closing the dump tank outlet valve O4 at 123.

The polymer product in the dump tank 10 after introducing the polymer product from the reactor 20 into the dump tank comprises a first amount of hydrocarbons, and the polymer product in the dump tank 10 after the majority of the liquid hydrocarbons have been removed from the vessel 11 at 122 comprises a second amount of hydrocarbons; the second amount of hydrocarbons can be less than or equal to about 1, 2, 3, 4, 5, 6, 7, 8, 9, 10, 15, 20, 25, or 30 weight percent (wt %) of the first amount of hydrocarbons.

As noted hereinabove, introducing of the motive gas via the motive gas inlet I3 at 121 can comprise introducing the motive gas from motive gas source 25 via a motive gas line 26 having a valve V4 configured to provide the motive gas to the motive gas inlet I3 at a motive gas pressure, wherein the motive gas pressure is greater than a pressure of a downstream unit 60 with which the hydrocarbon outlet line 15B is fluidly connected, and provides a differential pressure across the strainer 40 (e.g., the difference between the pressure in hydrocarbon outlet line 15B and the pressure in dump tank fluid outlet line 15/strainer inlet line 15A) that is less than a maximum differential pressure rating of the strainer 40. As depicted in FIG. 1, system 100 can further comprise reactor top vent line 22 fluidly connecting a top vent of reactor 20 (e.g., a vent within a top 5, 10, 20, 30, or 40% of a height HR of the reactor 20) with an inlet (e.g., motive gas inlet I3) of dump tank 10, such that gas removed from reactor 20 via top vent line 22 can be introduced into dump tank 10, prior to and/or during draining of the vessel 11 at 120.

Draining, at 120, can further comprise passing the strained liquid in hydrocarbon outlet line 15B through filter 50. Filter 50 has a filter mesh size that is less than the strainer mesh size of strainer 40. As noted above, in embodiments, the filter mesh size of filter 50 allows passage therethrough of particles having a particle size of less than about 150, 100, 50, 35, 25, 15, 10, 9, 8, 7, 6, 5, 4, 3, 2, or 1 μm, and prevents passage therethrough of particles having a particle size of greater than about 150, 100, 50, 35, 25, 15, 10, 9, 8, 7, 6, 5, 4, 3, 2, or 1 μm (e.g., greater than about 1 to 15, 15 to 25, 25 to 35, 35 to 50, 50 to 100, or 100 to 150 μm). Thus, filter 50 can be utilized to retain particles that pass through strainer 40, and prevent such particles from entering downstream unit 60.

As will be appreciated by one of skill in the art and with the help of this disclosure, the mesh size of the strainer 40 and the mesh size of the filter 50 can be selected to provide for minimization of particles in downstream unit 60, while also providing for an adequate rate of draining at 120. A smaller mesh size will provide for greater minimization of particles in downstream unit 60, while also reducing a rate of draining at 120, and increasing a pressure drop across the mesh. Accordingly, the strainer mesh size and/or the filter mesh size can be selected by balancing reduction in polymer particles in hydrocarbon outlet line 15B and/or filter outlet line 15D with a desirable flow rate of drainage during draining at 120.

With reference back to FIG. 2, in embodiments, method 105 of this disclosure can further comprise, at 130, after draining hydrocarbon liquid from the dump tank 10 at 120, flashing hydrocarbons from the dump tank 10 by reducing the pressure of the dump tank 10 from the motive gas pressure, such that liquid hydrocarbons remaining in the polymer product evaporate to provide a flash gas, and extracting the flash gas via at least one of the one or more gas outlets O1-O3 of the vessel 11. The method 105 can further comprise introducing the flash gas into a flare 45A/45B, an isobutane and nitrogen recovery unit (INRU) 46, a flash gas system 47, or a combination thereof In embodiments, the flash gas is sent via an isobutane and nitrogen recovery unit (INRU) and/or flash gas system outlet O3 and lines 18 and 18A and valve V8 to an INRU 46. Alternatively or additionally, the flash gas can be sent via an isobutane and nitrogen recovery unit (INRU) and/or flash gas system outlet O3 of vessel 11 via lines line 18 and 18B and valve V9 to a flash gas system 47. In this manner, hydrocarbons in the flash gas can be recovered. Alternatively, the flash gas can be sent via one or more flare outlets O1 to a flare, For example, flash gas can be sent via flare outlet O1 and flare outlet line 16A to a first flare 45A and/or flash gas can be sent via another flare outlet O1 and flare outlet line 16B to a second flare 45B.

As depicted in FIG. 2, a method 105 of this disclosure can further comprise purging the polymer product in the dump tank 10 at 140. Purging can comprise introducing a purge gas into the vessel via the purge gas inlet, whereby a purged gas comprising hydrocarbons is produced, and extracting the purged gas from the vessel via at least one of the one or more gas outlets, providing a purged polymer product in the dump tank. The purge gas can be introduced into the dump tank 10 during the purging at 140 at any suitable pressure. For example, in embodiments, purge gas can be introduced into the dump tank 10 during the purging at 140 at a pressure in a range of from about 3 to 150 psig, from about 3 to about 25 psig, from about 50 to about 150 psig, from about 75 to about 140 psig, or from about 90 to about 130 psig. In embodiments, the purging at 140 can be a "high" pressure purge, which can be effected at a purge pressure of, without limitation, greater than or equal to about 90, 100, 110, 120, or 130 psig, or in a range of from about 90 to about 130 psig. Such a high pressure purge, instead of a low pressure purge, when combined with draining of the liquid hydrocarbon from the polymer powder in the dump tank 10 at 120 and utilization of the vapor motive force at 121 to push the liquid hydrocarbon to the downstream unit 60 can enable a significantly improved (i.e., reduced) time for removal of residual hydrocarbon from the polymer product, in embodiments.

The purge gas can be introduced into the dump tank 10 during the purging at 140 at any suitable temperature. For example, in embodiments, the purge gas can be introduced into the dump tank 10 during the purging at 140 at a temperature in a range of from about 38° C. to 82° C., from about −20° C. to 90° C., or from about from about 30° C. to 85° C.

In embodiments, the purged polymer product in dump tank 10 after purging at 140 comprises less than or equal to about 1, 2, 3, 4, 5, 10, 15, 20, or 25 weight percent (wt %) of the hydrocarbons in the polymer product introduced into the dump tank 10 from the polymerization reactor 20 at 110.

In aspects, the vessel 11 of the dump tank 10 can be designed for low temperatures, e.g., temperatures as low as −19° C. However, due to the draining of the liquid hydrocarbons from the dump tank 10 at 120, the temperature reduction during the flashing at 130 and/or purging at 140 can be much less than conventionally experienced in the absence of the draining step 120, and such low temperature design may not be needed. Shorter flashing times at 120 and/or purging times at 140 can thus be realized, in embodiments, relative to conventional dump tank purging absent draining at 120. In embodiments, a time from introducing the polymer product into the dump tank 10 at 110 to providing the purged polymer product after purging at 140 can be less than about 36, 24, 20, 15, 14, 13, 12, 11, 10, or fewer hours. In embodiments, the time from introducing the polymer product into the dump tank 10 at 110 to providing the purged polymer product after purging at 140 can be less than about 15, 14, 13, 12, 11, 10, 9, 8, 7, 6, or 5% of a time from introducing the polymer product into a dump tank to providing a purged polymer product obtained via a method excluding draining the liquid hydrocarbons from the dump tank at 120.

In embodiments, a temperature within dump tank 10 during the method 105 (i.e., during the introducing at 110, the draining at 120, the flashing at 130, the purging at 140, and the dumping at 150) does not fall below about −20° C., −15° C., or −10° C. In embodiments, a temperature within dump tank 10 during the method 105 (i.e., during the introducing at 110, the draining at 120, the flashing at 130, the purging at 140, and the dumping at 150) remains at least about 5, 10, 15, 20, 25, 30, 35, or 40° C. above a temperature obtained during a same method absent the draining at 120.

The method 105 can further comprise introducing the purged gas into a flare 45A/45B, an isobutane and nitrogen recovery unit (INRU) 46, a flash gas system 47, the atmosphere 48, or a combination thereof. In embodiments, the purge gas is sent via an isobutane and nitrogen recovery unit (INRU) and/or flash gas system outlet O3 and lines 18 and 18A and valve V8 to an INRU 46. Alternatively or additionally, the purge gas can be sent via an isobutane and nitrogen recovery unit (INRU) and/or flash gas system outlet O3 of vessel 11 via lines line 18 and 18B and valve V9 to a flash gas system 47. In this manner, hydrocarbons in the purge gas can be recovered. Alternatively or additionally, purge gas can be sent via one or more flare outlets O1 to a flare, For example, purge gas can be sent via flare outlet O1 and flare outlet line 16A to a first flare 45A and/or purge gas can be sent via another flare outlet O1 and flare outlet line 16B to a second flare 45B. In embodiments, depending on the composition thereof, the purge gas can be sent via outlet to atmosphere O2 to atmosphere 48 via gas outlet line 17 and valve V7.

In embodiments, draining hydrocarbon liquid from the dump tank 10 at 120 comprises maintaining a pressure of the dump tank 10 at a draining pressure of greater than a vapor pressure of the hydrocarbons in the polymer product within vessel 11 until a majority of the liquid hydrocarbons have been removed from the vessel 11, such that a majority of the hydrocarbons remain liquid during the draining at 120. In such embodiments, a method of this disclosure can comprise: introducing polymer product from polymerization reactor 20 into dump tank 10 at 110, wherein the polymer product comprises polymer and hydrocarbons, including liquid hydrocarbons; and draining liquid hydrocarbons from the dump tank at 120 by: opening the dump tank outlet valve O4 on the fluid outlet line 15 (with valve V11 closed to prevent fluid flow to dumpster or other container 70) and introducing motive gas at a motive gas pressure via the motive gas inlet 13 of the dump tank 10, whereby fluid comprising liquid hydrocarbons and motive gas flows out the fluid outlet O4 to strainer 40 via strainer inlet line 15A, whereby the liquid hydrocarbons pass, as a strained liquid, through the strainer 40 to hydrocarbon outlet line 15B and particles having the particle size greater than a retained particle size are prevented passage through the strainer 40 to the hydrocarbon outlet line 15B, wherein the strainer 40 is fluidly connected with the fluid outlet line 15 via strainer inlet line 15A and has a strainer mesh size that allows passage of liquid hydrocarbons therethrough into the hydrocarbon outlet line 15B and prevents passage therethrough of particles having a retained particle size of greater than about 50, 100, or 150 micrometers (μm); and, at 122, maintaining a pressure of the dump tank 10 at a draining pressure of greater than a vapor pressure of the hydrocarbons in the polymer product until a majority of the liquid hydrocarbons have been removed from the vessel 11, such that a majority of the hydrocarbons remain liquid during the draining; and ceasing the introducing of the motive gas into the dump tank and closing the dump tank outlet valve at 123. As depicted in FIG. 3, the method 105 can further comprise, at 122, monitoring the hydrocarbon outlet line 15B during the draining at 120 to determine when the majority of the liquid hydrocarbons have been removed from the vessel 11.

As noted previously, such a method 105 can further comprise, at 130, flashing hydrocarbons from the vessel 11 by reducing the pressure of the dump tank 10 from the draining pressure, whereby at least a portion of any liquid hydrocarbons remaining in the polymer product evaporate to provide a flash gas, and extracting the flash gas via at least one of the one or more gas outlets O1-O3 of the vessel 11; and/or, at 140, purging the polymer product in the dump tank 10, wherein purging comprises introducing the purge gas into the dump tank 10 via purge gas source 35, purge gas line 36, valve V5, and/or the purge gas inlet 14, whereby a purged gas comprising hydrocarbons is produced, and extracting the purged gas from the dump tank 10 via at least one of the one or more gas outlets O1-O3, providing a purged polymer product in the dump tank 10.

The liquid hydrocarbons in hydrocarbon outlet line 15B can be introduced into downstream unit 60. As depicted in FIG. 2, subsequent the draining at 120, the flashing at 130, and/or the purging at 140, polymer in vessel 11 can be dumped into dumpster or other container 70 by opening fluid outlet valve V10 and valve V11, while keeping valve V13 and valve V14 and/or valve V15 closed.

The dump tank 10 can be any dump tank known in the art. In embodiments, the dump tank 10 is a dump tank substantially as described in U.S. Patent App. No. 2020/0354483, the disclosure of which is hereby incorporated herein in its entirety for purposes not contrary to this disclosure. For example, with reference to FIG. 4, which is a schematic of an exemplary dump tank vessel, according to embodiments of this disclosure, in embodiments, dump tank vessel 11 is a generally cylindrical vessel having a cap section 1, a bottom cone section 2, and a straight section 3. Straight section 3 of vessel 11 is above bottom cone section 2 and can have a height $H_3$ in a range of from about 8-10 to about 80-100 feet or more (from about 2.4-3.0 to about 24-30 m or more). Straight section 3 of vessel 11 can have an interior diameter $D_1$ in a range of from about 6 to about 25 feet (from about 1.8 to about 7.6 m). In embodiments, cap 1 of vessel 11 can have a height $H_1$ of about twice the diameter $D_1$. In embodiments, cap 1 of vessel 11 is ellipsoidal, and $H_1$ is about 20, 25, 30, 40, or 50% $D_1$. The bottom cone section 2 can have a height $H_2$ in a range of from about 3 to about 35 feet (from about 0.9 to about 10.6 m). In embodiments, bottom cone section 2 forms an angle α of less than or equal to 45, 60, or 70 degrees from horizontal. Utilization of such an angle α can minimize an amount of polymer fluff below the gas distribution system 7. A section 4 can be located below bottom cone section 2. Section 4 can contain an insert for altering the flow of gas (e.g., treatment gas) introduced thereto, such as, without limitation, a J-Purge™ cross available from Jenike and Johanson, a Chinese hat insert, or a Binsert. Section 4 CAN have straight sides with a height $H_4$ in a range of from about 2 to about 12 feet (from about 0.6 to about 3.6 m). Section 4 of vessel 11 can have an interior diameter D2 in a range of from about 2 to about 12 feet (from about 0.6 to about 3.6 m). A bottom nozzle 5 can be located below bottom cone section 2 and/or section 4, when present. Bottom nozzle 5 can be conical. In embodiments, bottom nozzle 5 can have a height $H_5$ in a range of from about 1 to about 17 feet (from about 0.3 to about 5.1 m), from about 1 to about 20 feet (from about 0.3 to about 6.0 m), or from about 2 to about 20 feet (from about 0.6 to about 6.0 m). Nozzle 5 can have an outlet diameter $D_3$ in a range of from about 1 to about 5 feet (from about 0.3 to about 1.5 m), from about 1 to about 4 feet (from about 0.3 to about 1.2 m), or from about 1 to about 3 feet (from about 0.3 to about 0.9 m). In embodiments, bottom nozzle 5 forms an angle α' of less than or equal to 45, 60, or 70 degrees from horizontal. A greater angle α and/or angle α' can be utilized to minimize the likelihood of plugging the vessel 11 (e.g., when being emptied). In embodiments, height H6 equals the sum of the height $H_1$ of cap 1 and the height $H_3$ of straight section 3. In embodiments a total height HT, equal to $H_1+H_2+H_3+H_4+H_5$ is in a range of from about 10 to about 100 feet or more (from about 3.0 to about 30.4 m or more), from about 30 to about 100 feet (from about 6.0 to about 30.4 m), or from about 20 to about 100 feet (from about 6.0 to about 30.4 m).

The gas distribution system 7 can be at least partially disposed within the bottom cone section 2, proximate above the bottom cone section 2 (e.g., within 5, 4, 3, 2, 1, or 0.5 feet), proximate below the bottom cone section 2 (e.g., within 5, 4, 3, 2, 1, or 0.5 feet), or a combination thereof. For example, in the embodiment of FIG. 4, gas distribution system 7 is below cone section 2, within section 4. In embodiments, gas distribution system 7 is located at the bottom outlet of bottom cone section 2. In embodiments, gas distribution system 7 comprises a distributor located in the bottom portion (e.g., lower 10, 15, 20, 30, or 40% of the total height HT) of the dump tank vessel 11.

Figure 4:
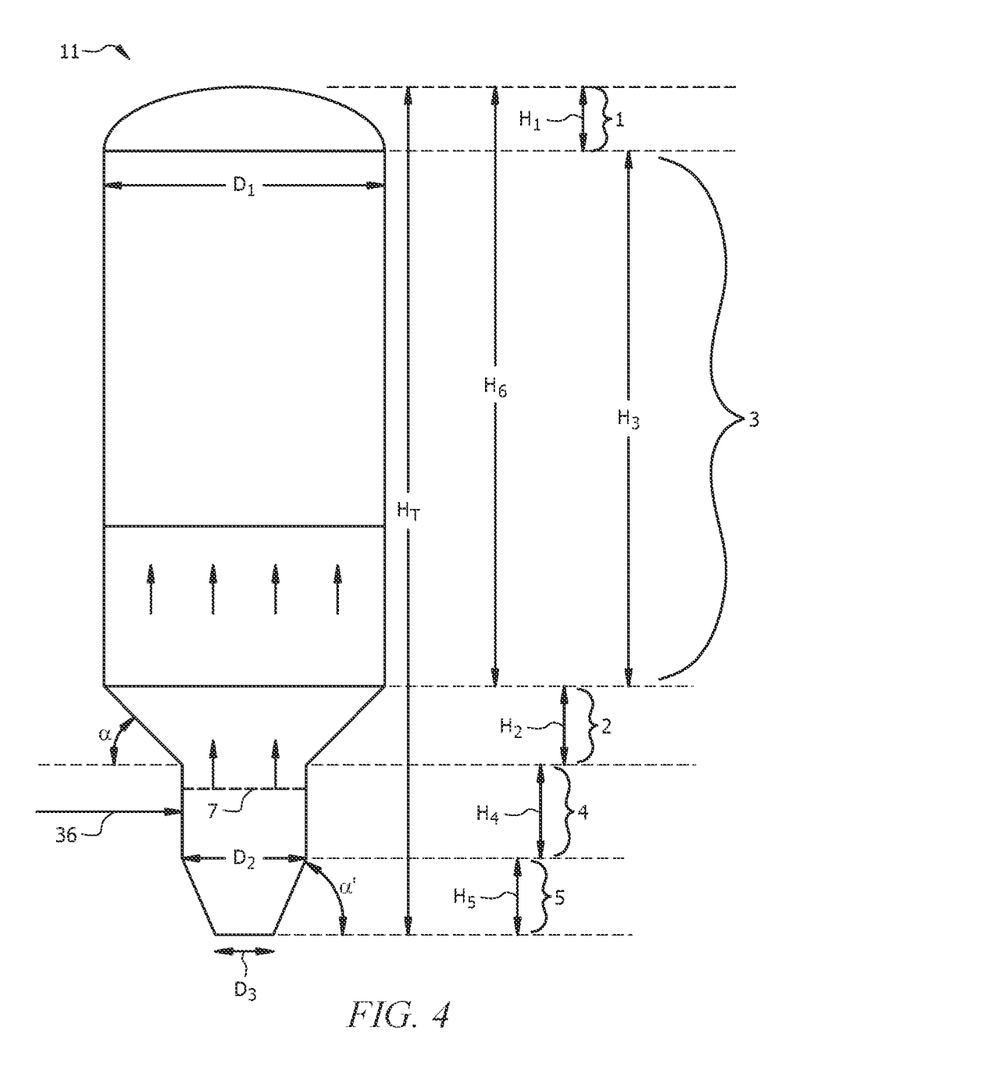
FIG. 4 is a schematic of an exemplary dump tank vessel, according to embodiments of this disclosure.

In embodiments, dump tank vessel 11 does not comprise a steam jacket in contact therewith to provide heat to the vessel 11. For example, in embodiments, dump tank vessel 11 does not comprise a steam jacket conventionally utilized on the bottom cone section 2.

The system and method of this disclosure may provide a number of benefits relative to conventional systems (e.g., dump tanks) and methods utilized for removing non-product components from a polymer fluff transferred to a dump tank during a polymerization reactor dump. Without limitation, a number of potential advantages will be outlined hereinbelow.

The herein disclosed dump tank and method of operating same provide for reducing a time required for purging the polymer product. The ability to quickly recover from a reactor dump can provide significant economic improvements due to increased reactor online time. The herein disclosed system and method also provide for an ability to recover substantially all of the hydrocarbon drained from the vessel 11 of the dump tank 10. This can provide increased recovery of hydrocarbon liquid from the dump tank 10. Additionally, draining of the liquid hydrocarbons from dump tank 10 at 120 can allow for the use of more economical vessels 11, in embodiments, i.e., low temperature carbon steel may not be necessary.

In embodiments, draining of the hydrocarbon liquids from the dump tank at 120 enables the use of a high pressure purge at 140, which can be utilized, in embodiments, to further reduce the purge time. In embodiments, the system and method described herein provide for such a high-pressure purge of the dump tank 10 (e.g., at a purge pressure of greater than conventional, such as, without limitation, greater than or equal to about 90, 100, 110, 120, or 130 psig, or in a range of from about 90 to about 130 psig). Such a high-pressure purge, instead of a conventional low-pressure purge, when combined with novel draining of the liquid hydrocarbon from the polymer powder in the dump tank 10 and utilization of the vapor motive force at 121 to push the liquid hydrocarbon to the downstream unit 60, as detailed herein, can enable a significantly improved (i.e., reduced) time for removal of residual hydrocarbon from the polymer product. Draining 120 of liquid hydrocarbon at 120 can thus be combined with performing a high pressure purge, at 140, in embodiments, to further reduce the dump tank 10 purge time. Higher pressures during purging at 140 can reduce the flashing and associated temperature drop, which can improve mass transfer during purging 140, thus speeding up the purging at 140.

Other advantages will be apparent to those of skill in the art and with the help of this disclosure.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are non-limiting, specific embodiments in accordance with the present disclosure:

In a first embodiment, a system comprises: a dump tank configured to receive a reactor product comprising a polymer and hydrocarbons, including liquid hydrocarbons, wherein the dump tank comprises a vessel having a reactor product inlet, a motive gas inlet, a purge gas inlet, one or more gas outlets, and a fluid outlet, wherein the motive gas inlet is configured to introduce a motive gas into an upper portion (e.g., is located in a top 40, 30, 20, 15, 10% along a height) of the vessel, wherein the purge gas inlet is configured to introduce a purge gas into a lower portion (e.g., is located in a bottom 40, 30, 20, 15, 10% along the height) of the vessel, wherein the one or more gas outlets are located at a top (e.g., a top 40, 30, 20, 15, 10% of a height) of the vessel, and wherein the fluid outlet is located at a bottom (e.g., within a bottom 40, 30 20, 15, 10%) of the vessel and fluidly connected with a dump tank fluid outlet line having a dump tank outlet valve to control flow of fluid out of the dump tank via the fluid outlet; and a strainer, wherein the strainer is fluidly connected with the dump tank fluid outlet line via a strainer inlet, wherein the strainer allows passage of liquid hydrocarbons therethrough (e.g., strained liquid hydrocarbons), and wherein the strained liquid hydrocarbons exit the strainer via a strainer outlet and flow into a hydrocarbon outlet line fluidly connected to the strainer outlet, and wherein the strainer prevents passage therethrough of particles having a particle size (e.g., a retained particle size) of greater than about 50, 75, 100, 125, or 150 micrometers (μm).

A second embodiment can include the system of the first embodiment, further comprising a filter downstream of the strainer and fluidly connected therewith via the hydrocarbon outlet line (e.g., wherein the filter has an inlet fluidly connected with the hydrocarbon outlet line to receive the strained hydrocarbons), wherein the filter prevents passage therethrough of particles having a particle size of greater than about 150, 100, 50, 35, 25, 15, 10, 9, 8, 7, 6, 5, 4, 3, 2, or 1 μm (e.g., greater than about 1 to 15, 15 to 25, 25 to 35, 35 to 50, 50 to 100, or 100 to 150 μm) and wherein the filter has an outlet for removal of a filtrate (e.g., filtered liquid hydrocarbons).

A third embodiment can include the system of the first or the second embodiment, further comprising a source of the motive gas, wherein the source of the motive gas is fluidly connected with the motive gas inlet, and wherein the source comprises a line and/or a tank comprising the motive gas.

A fourth embodiment can include the system of any one of the first to the third embodiments, wherein the motive gas comprises ethylene, ethane, nitrogen, fuel gas, methane, or a combination thereof.

A fifth embodiment can include the system of any one of the first to fourth embodiments further comprising a purge gas source, wherein the purge gas source is fluidly connected with the purge gas inlet, and wherein the purge gas source comprises at least one line and/or a tank comprising the purge gas.

A sixth embodiment can include the system of the fifth embodiment, wherein the purge gas comprises nitrogen (e.g., more than 98, 98.5, or 99 wt % nitrogen), fuel gas, cracker tail gas, methane, or a combination thereof.

A seventh embodiment can include the system of any one of the first to sixth embodiments further comprising the reactor, wherein the reactor is upstream from the dump tank, and wherein the reactor (e.g., a reactor product outlet) is fluidly connected via a reactor product outlet line with the reactor product inlet of the dump tank.

An eighth embodiment can include the system of the seventh embodiment, wherein the reactor comprises a polymerization reactor for the production of polyethylene (e.g., polyethylene homopolymer or polyethylene copolymer such as an ethylene and 1-hexene copolymer).

A ninth embodiment can include the system of the eighth embodiment, wherein the polymerization reactor comprises a loop slurry reactor.

A tenth embodiment can include the system of any one of the first to ninth embodiments further comprising a downstream unit fluidly connected with the hydrocarbon outlet line.

An eleventh embodiment can include the system of the tenth embodiment, wherein the downstream unit comprises a recycle surge tank (e.g., wherein the recycle surge tank provides surge for the recycle isobutane pumps), a heavies/dehexanizer column configured to separate C6 and heavier from the isobutane sent to fractionation, or another downstream unit.

A twelfth embodiment can include the system of any one of the ninth to eleventh embodiments further comprising a motive gas valve configured to provide the motive gas to the motive gas inlet at a motive gas pressure, wherein the motive gas pressure is greater than a pressure of the downstream unit and greater than a vapor pressure of the hydrocarbons in the dump tank, and provides a differential pressure across the strainer that is less than a maximum differential pressure rating of the strainer.

A thirteenth embodiment can include the system of the twelfth embodiment, wherein the differential pressure is less than about 50, 40, 30, 20, or 10 psig.

A fourteenth embodiment can include the system of any one of the first to thirteenth embodiments, wherein the strainer is a drop-in component designed to facilitate removal of the strainer from the system for cleaning or replacing.

In a fifteenth embodiment, a method comprises: introducing a polymer product from a polymerization reactor into a dump tank of the system of any one of the first to the fourteenth embodiments; and draining liquid hydrocarbons from the dump tank by: opening the dump tank outlet valve on the dump tank fluid outlet line and introducing motive gas via the motive gas inlet, whereby fluid comprising liquid hydrocarbons and motive gas flows out the fluid outlet to the strainer, whereby the liquid hydrocarbons pass through the strainer to the hydrocarbon outlet line and particles having the particle size greater than the retained particle size are prevented passage through the strainer to the hydrocarbon outlet line; monitoring the hydrocarbon outlet line to determine when a majority of the liquid hydrocarbons have been removed from the vessel; and ceasing the introducing of the motive gas into the dump tank and closing the dump tank outlet valve.

A sixteenth embodiment can include the method of the fifteenth embodiment, wherein the polymer product in the dump tank after introducing the polymer product from the reactor into the dump tank comprises a first amount of hydrocarbons, and wherein the polymer product in the dump tank after the majority of the liquid hydrocarbons have been removed from the vessel comprises a second amount of hydrocarbons, and wherein the second amount of hydrocarbons is less than or equal to about 1, 2, 3, 4, 5, 6, 7, 8, 9, 10, 15, 20, 25, or 30 weight percent (wt %) of the first amount of hydrocarbons.

A seventeenth embodiment can include the method of the fifteenth or sixteenth embodiments, wherein the introducing of the motive gas via the motive gas inlet comprises introducing the motive gas via a motive gas valve configured to provide the motive gas to the motive gas inlet at a motive gas pressure, wherein the motive gas pressure is greater than a pressure of a downstream unit with which the hydrocarbon outlet line is fluidly connected, and provides a differential pressure across the strainer that is less than a maximum differential pressure rating of the strainer.

An eighteenth embodiment can include the method of the seventeenth embodiment, further comprising flashing hydrocarbons from the dump tank by reducing the pressure of the dump tank from the motive gas pressure, whereby liquid hydrocarbons remaining in the polymer product evaporate to provide a flash gas, and extracting the flash gas via at least one of the one or more gas outlets of the vessel.

A nineteenth embodiment can include the method of the eighteenth embodiment further comprising purging the polymer product in the dump tank, wherein purging comprises introducing a purge gas into the vessel via the purge gas inlet, whereby a purged gas comprising hydrocarbons is produced, and extracting the purged gas from the vessel via at least one of the one or more gas outlets, providing a purged polymer product in the dump tank.

A twentieth embodiment can include the method of the nineteenth embodiment, wherein the purge gas is introduced into the dump tank during the purging at a pressure in a range of from about 3 to 150 psig, from about 3 to about 25 psig, from about 50 to about 150 psig, from about 75 to about 140 psig, or from about 90 to about 130 psig.

A twenty first embodiment can include the method of the nineteenth or twentieth embodiments, wherein the purge gas is introduced into the dump tank during the purging at a temperature in a range of from about 38° C. to 82° C., from about −20° C. to 90° C., or from about from about 30° C. to 85° C.

A twenty second embodiment can include the method of any one of the nineteenth to twenty first embodiments, wherein the purged polymer product comprises less than or equal to about 1, 2, 3, 4, 5, 10, 15, 20, or 25 weight percent (wt %) of the hydrocarbons in the polymer product introduced into the dump tank from the polymerization reactor.

A twenty third embodiment can include the method of any one of the nineteenth to twenty second embodiments, wherein a time from introducing the polymer product into the dump tank to providing the purged polymer product is less than about 36, 24, 20, 15, 14, 13, 12, 11, 10, or fewer hours and/or is less than about 15, 10, 8. 6, or 5% of a time from introducing the polymer product into the dump tank to providing the purged polymer product obtained via a method excluding draining the liquid hydrocarbons from the dump tank.

A twenty fourth embodiment can include the method of any one of the nineteenth to twenty third embodiments further comprising introducing the purged gas into a flare, an isobutane and nitrogen recovery unit (INRU), a flash gas system, or a combination thereof.

A twenty fifth embodiment can include the method of any one of the eighteenth to twenty fourth embodiments further comprising introducing the flash gas into a flare, an isobutane and nitrogen recovery unit (INRU), a flash gas system, or a combination thereof.

In a twenty sixth embodiment, a method comprises: introducing a polymer product from a polymerization reactor into a dump tank, wherein the polymer product comprises a polymer and hydrocarbons, including liquid hydrocarbons, and wherein the dump tank comprises: a vessel having a reactor product inlet, a motive gas inlet, a purge gas inlet, one or more gas outlets, and a fluid outlet, wherein the motive gas inlet is configured to introduce a motive gas into an upper portion (e.g., is located in a top 40, 30, 20, 15, or 10% along a height) of the vessel, wherein the purge gas inlet is configured to introduce a purge gas into a lower portion (e.g., is located in a bottom 40, 30, 20, 15, or 10% along the height) of the vessel, wherein the one or more gas outlets are located at a top (e.g., a top 40, 30, 20, 15, or 10% of a height of the vessel), and wherein the fluid outlet is located at a bottom (e.g., within a bottom 40, 20, 20, 15, or 10%) of the vessel and fluidly connected with a dump tank fluid outlet line having a dump tank outlet valve to control flow of fluid out of the dump tank via the fluid outlet, wherein the dump tank outlet valve is in a closed position during the introducing of the polymer product into the dump tank from the reactor; and draining liquid hydrocarbons from the dump tank by: opening the dump tank outlet valve on the fluid outlet line and introducing motive gas at a motive gas pressure via the motive gas inlet, whereby fluid comprising liquid hydrocarbons (and, in some embodiments, also motive gas) flows out the fluid outlet to a strainer, whereby the liquid hydrocarbons pass, as a strained liquid, through the strainer to a hydrocarbon outlet line and particles having the particle size greater than a retained particle size are prevented passage through the strainer to the hydrocarbon outlet line, wherein the strainer is fluidly connected with the fluid outlet line and has a strainer mesh size that allows passage of liquid hydrocarbons therethrough into the hydrocarbon outlet line and prevents passage therethrough of particles having a retained particle size of greater than about 50, 100, or 150 micrometers (μm); and maintaining a pressure of the dump tank at a draining pressure of greater than a vapor pressure of the hydrocarbons in the polymer product until a majority of the liquid hydrocarbons have been removed from the vessel, such that a majority of the hydrocarbons remain liquid during the draining; and ceasing the introducing of the motive gas into the dump tank and closing the dump tank outlet valve.

A twenty seventh embodiment can include the method of the twenty sixth embodiment further comprising monitoring the hydrocarbon outlet line during the draining to determine when the majority of the liquid hydrocarbons have been removed from the vessel.

A twenty eighth embodiment can include the method of any one the twenty sixth or twenty seventh embodiments, further comprising: flashing hydrocarbons from the vessel by reducing the pressure of the dump tank from the draining pressure, whereby at least a portion of any liquid hydrocarbons remaining in the polymer product evaporate to provide a flash gas, and extracting the flash gas via at least one of the one or more gas outlets of the vessel.

A twenty ninth embodiment can include the method of the twenty eighth embodiment further comprising purging the polymer product in the dump tank, wherein purging comprises introducing the purge gas into the dump tank via the purge gas inlet, whereby a purged gas comprising hydrocarbons is produced, and extracting the purged gas from the dump tank via at least one of the one or more gas outlets, providing a purged polymer product in the dump tank.

A thirtieth embodiment can include the method of the twenty ninth embodiment, wherein the purge gas is introduced into the dump tank during the purging at a pressure in a range of from about 3 to 150 psig, from about 3 to about 25 psig, from about 50 to about 150 psig, from about 75 to about 140 psig, or from about 90 to about 130 psig.

A thirty first embodiment can include the method of the twenty ninth or thirtieth embodiments, wherein the purged polymer product comprises less than or equal to about 1, 2, 3, 4, 5, 10, 15, 20, or 25 weight percent (wt %) of the hydrocarbons in the polymer product introduced into the dump tank from the polymerization reactor.

A thirty second embodiment can include the method of any one of the twenty ninth to thirty first embodiments, wherein a time from introducing the polymer product into the dump tank to providing the purged polymer product is less than about 24, 20, 15, or 12 hours and/or is less than about 20, 15, or 10% of a time from introducing the polymer product into the dump tank to providing the purged polymer product obtained via a method excluding draining the liquid hydrocarbons from the dump tank.

A thirty third embodiment can include the method of any one of any one of the twenty sixth to thirty second embodiments, wherein draining further comprises passing the strained liquid through a filter, wherein the filter has a filter mesh size that is less than the strainer mesh size.

A thirty fourth embodiment can include the method of the thirty third embodiment, wherein the filter mesh size allows passage therethrough of particles having a particle size of less than about 150, 100, 50, 35, 25, 15, 10, 9, 8, 7, 6, 5, 4, 3, 2, or 1 μm, and prevents passage therethrough of particles having a particle size of greater than about 150, 100, 50, 35, 25, 15, 10, 9, 8, 7, 6, 5, 4, 3, 2, or 1 μm (e.g., greater than about 1 to 15, 15 to 25, 25 to 35, 35 to 50, 50 to 100, or 100 to 150 μm).

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A system comprising:
a dump tank configured to receive a reactor product comprising a polymer and hydrocarbons, including liquid hydrocarbons, wherein the dump tank comprises a vessel having a reactor product inlet, a motive gas inlet, a purge gas inlet, one or more gas outlets, and a fluid outlet, wherein the motive gas inlet is configured to introduce a motive gas into an upper portion of the vessel, wherein the purge gas inlet is configured to introduce a purge gas into a lower portion of the vessel, wherein the one or more gas outlets are located at a top of the vessel, and wherein the fluid outlet is located at a bottom of the vessel and fluidly connected with a dump tank fluid outlet line having a dump tank outlet valve to control flow of fluid out of the dump tank via the fluid outlet; and
a strainer, wherein the strainer is fluidly connected with the dump tank fluid outlet line and allows passage of liquid hydrocarbons therethrough into a hydrocarbon outlet line and prevents passage therethrough of particles having a retained particle size of greater than about 150 micrometers (μm).

2. The system of claim 1 further comprising a filter downstream of the strainer and fluidly connected therewith via the hydrocarbon outlet line, wherein the filter prevents passage therethrough of particles having a particle size of greater than about 50 μm.

3. The system of claim 1, wherein the motive gas comprises ethylene, ethane, nitrogen, fuel gas, methane, or a combination thereof.

4. The system of claim 1, wherein the purge gas comprises nitrogen, fuel gas, cracker tail gas, methane, or a combination thereof.

5. The system of claim 1 further comprising the reactor, wherein the reactor is upstream from the dump tank, and wherein the reactor is fluidly connected via a reactor product outlet line with the reactor product inlet of the dump tank, and, wherein the reactor comprises a polymerization reactor for the production of polyethylene.

6. The system of claim 1 further comprising a motive gas valve configured to provide the motive gas to the motive gas inlet at a motive gas pressure, wherein the motive gas pressure is greater than a pressure of a downstream unit fluidly connected with the hydrocarbon outlet line and greater than a vapor pressure of the hydrocarbons in the dump tank, and provides a differential pressure across the strainer that is less than a maximum differential pressure rating of the strainer.

7. A method comprising:
   introducing a polymer product from a polymerization reactor into a dump tank of a dump tank system comprising: a dump tank configured to receive a reactor product comprising a polymer and hydrocarbons, including liquid hydrocarbons, wherein the dump tank comprises a vessel having a reactor product inlet, a motive gas inlet, a purge gas inlet, one or more gas outlets, and a fluid outlet, wherein the motive gas inlet is configured to introduce a motive gas into an upper portion of the vessel, wherein the purge gas inlet is configured to introduce a purge gas into a lower portion of the vessel, wherein the one or more gas outlets are located at a top of the vessel, and wherein the fluid outlet is located at a bottom of the vessel and fluidly connected with a dump tank fluid outlet line having a dump tank outlet valve to control flow of fluid out of the dump tank via the fluid outlet; and a strainer, wherein the strainer is fluidly connected with the dump tank fluid outlet line and allows passage of liquid hydrocarbons therethrough into a hydrocarbon outlet line and prevents passage therethrough of particles having a retained particle size of greater than about 150 micrometers (μm); and
   draining liquid hydrocarbons from the dump tank by:
      opening the dump tank outlet valve on the dump tank fluid outlet line and introducing motive gas via the motive gas inlet, whereby fluid comprising liquid hydrocarbons and motive gas flows out the fluid outlet to the strainer, whereby the liquid hydrocarbons pass through the strainer to the hydrocarbon outlet line and particles having the particle size greater than the retained particle size are prevented passage through the strainer to the hydrocarbon outlet line;
      monitoring the hydrocarbon outlet line to determine when a majority of the liquid hydrocarbons have been removed from the vessel; and
      ceasing the introducing of the motive gas into the dump tank and closing the dump tank outlet valve.

8. The method of claim 7, wherein the polymer product in the dump tank after introducing the polymer product from the reactor into the dump tank comprises a first amount of hydrocarbons, and wherein the polymer product in the dump tank after the majority of the liquid hydrocarbons have been removed from the vessel comprises a second amount of hydrocarbons, and wherein the second amount of hydrocarbons is less than or equal to about 30 weight percent (wt %) of the first amount of hydrocarbons.

9. The method of claim 7, wherein the introducing of the motive gas via the motive gas inlet comprises introducing the motive gas via a motive gas valve configured to provide the motive gas to the motive gas inlet at a motive gas pressure, wherein the motive gas pressure is greater than a pressure of a downstream unit with which the hydrocarbon outlet line is fluidly connected, and provides a differential pressure across the strainer that is less than a maximum differential pressure rating of the strainer.

10. The method of claim 9 further comprising flashing hydrocarbons from the dump tank by reducing the pressure of the dump tank from the motive gas pressure, whereby at least a portion of liquid hydrocarbons remaining in the polymer product evaporate to provide a flash gas, and extracting the flash gas via at least one of the one or more gas outlets of the vessel.

11. The method of claim 10 further comprising purging the polymer product in the dump tank, wherein purging comprises introducing a purge gas into the vessel via the purge gas inlet, whereby a purged gas comprising hydrocarbons is produced, and extracting the purged gas from the vessel via at least one of the one or more gas outlets to provide a purged polymer product in the dump tank.

12. The method of claim 11, wherein the purged polymer product comprises less than or equal to about 25 weight percent (wt %) of the hydrocarbons in the polymer product introduced into the dump tank from the polymerization reactor.

13. The method of claim 11, wherein a time from introducing the polymer product into the dump tank to providing the purged polymer product is less than about 10 hours and/or less than about 15% of a time from introducing the polymer product into the dump tank to providing the purged polymer product obtained via a method excluding draining the liquid hydrocarbons from the dump tank.

14. The method of claim 11 further comprising introducing the purged gas into a flare, an isobutane and nitrogen recovery unit (INRU), a flash gas system, or a combination thereof.

15. The method of claim 10 further comprising introducing the flash gas into a flare, an isobutane and nitrogen recovery unit (INRU), a flash gas system, or a combination thereof.

16. A method comprising:
   introducing a polymer product from a polymerization reactor into a dump tank, wherein the polymer product comprises a polymer and hydrocarbons, including liquid hydrocarbons, and wherein the dump tank comprises: a vessel having a reactor product inlet, a motive gas inlet, a purge gas inlet, one or more gas outlets, and a fluid outlet, wherein the motive gas inlet is configured to introduce a motive gas into an upper portion of the vessel, wherein the purge gas inlet is configured to introduce a purge gas into a lower portion of the vessel, wherein the one or more gas outlets are located at a top of the vessel, and wherein the fluid outlet is located at a bottom of the vessel and fluidly connected with a dump tank fluid outlet line having a dump tank outlet valve to control flow of fluid out of the dump tank via the fluid outlet, wherein the dump tank outlet valve is in a closed position during the introducing of the polymer product into the dump tank from the reactor; and draining liquid hydrocarbons from the dump tank by:
opening the dump tank outlet valve on the fluid outlet line and introducing motive gas at a motive gas pressure via the motive gas inlet, whereby liquid hydrocarbons flow out the fluid outlet to a strainer, whereby the liquid hydrocarbons pass, as a strained liquid, through the strainer to a hydrocarbon outlet line and particles having the particle size greater than a retained particle size are prevented passage through the strainer to the hydrocarbon outlet line, wherein the strainer is fluidly connected with the fluid outlet line and has a strainer mesh size that allows passage of liquid hydrocarbons therethrough into the hydrocarbon outlet line and prevents passage therethrough of particles having a retained particle size of greater than about 150 micrometers (μm); and maintaining a pressure of the dump tank at a draining pressure of greater than a vapor pressure of the hydrocarbons in the polymer product until a majority of the liquid hydrocarbons have been removed from the vessel, such that a majority of the hydrocarbons remain liquid during the draining; and ceasing the introducing of the motive gas into the dump tank and closing the dump tank outlet valve.

17. The method of claim 16 further comprising monitoring the hydrocarbon outlet line during the draining to determine when the majority of the liquid hydrocarbons have been removed from the vessel.

18. The method of claim 16 further comprising: flashing hydrocarbons from the vessel by reducing the pressure of the dump tank from the draining pressure, whereby at least a portion of any liquid hydrocarbons remaining in the polymer product evaporate to provide a flash gas, and extracting the flash gas via at least one of the one or more gas outlets of the vessel.

19. The method of claim 18 further comprising purging the polymer product in the dump tank, wherein purging comprises introducing the purge gas into the dump tank via the purge gas inlet, whereby a purged gas comprising hydrocarbons is produced, and extracting the purged gas from the dump tank via at least one of the one or more gas outlets to provide a purged polymer product in the dump tank.

20. The method of claim 16, wherein draining further comprises passing the strained liquid through a filter, wherein the filter has a filter mesh size that is less than the strainer mesh size.

* * * * *